United States Patent Office 3,411,425
Patented Nov. 19, 1968

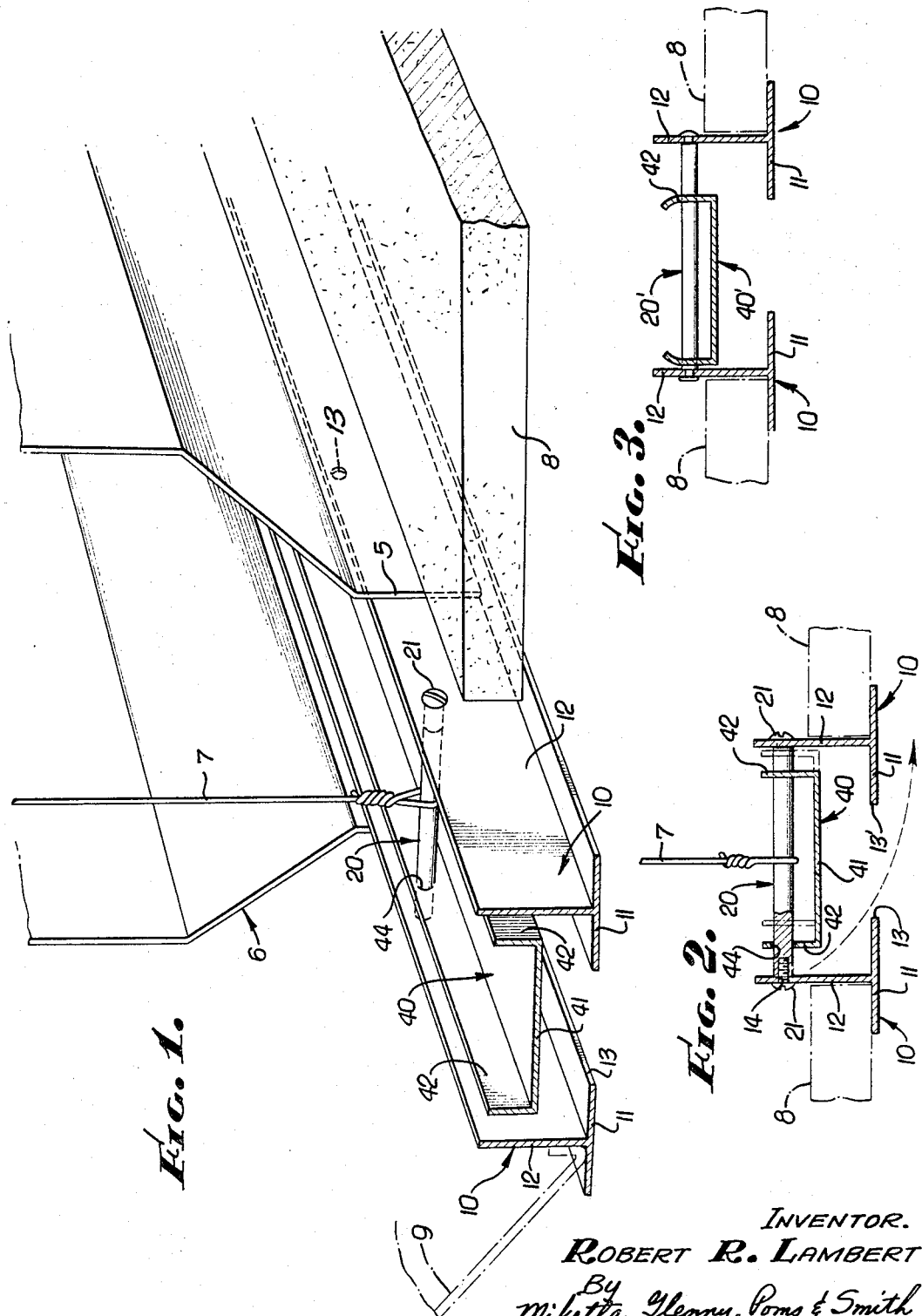

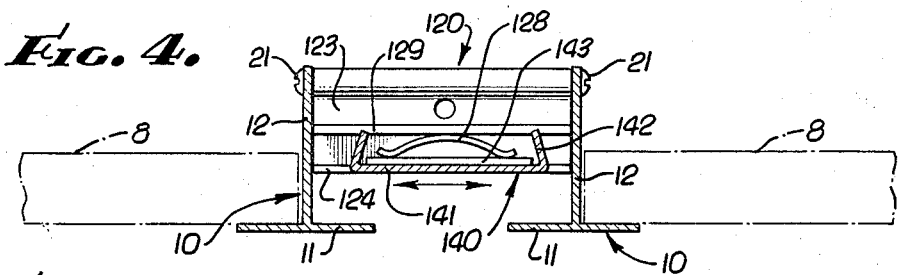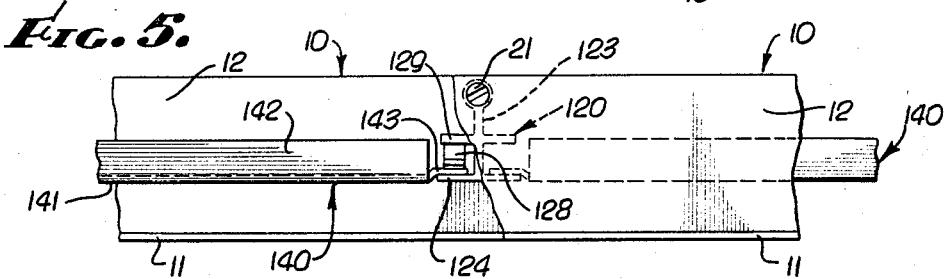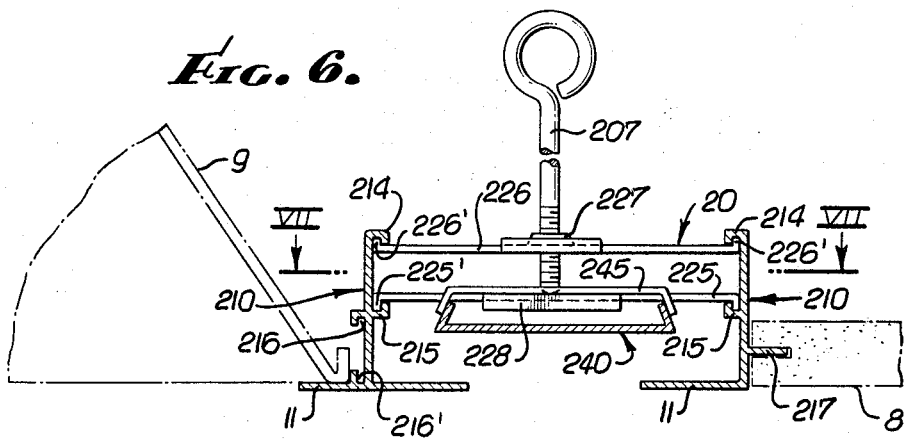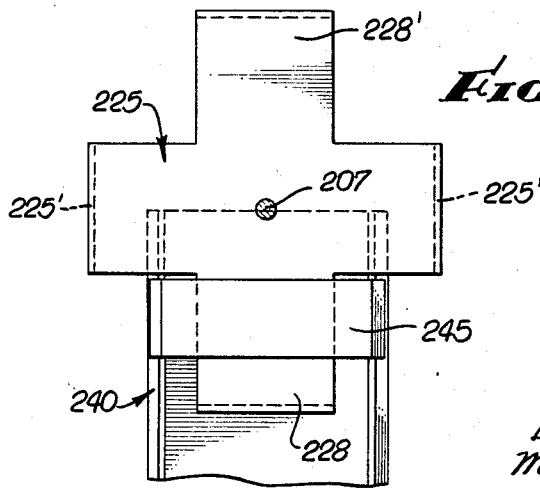

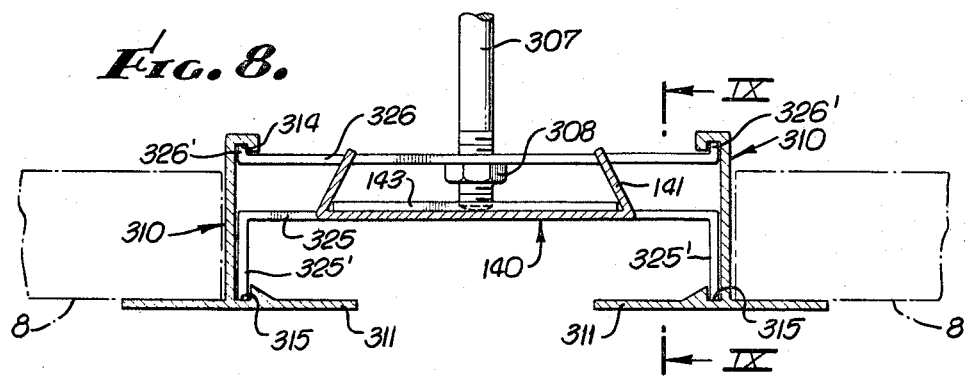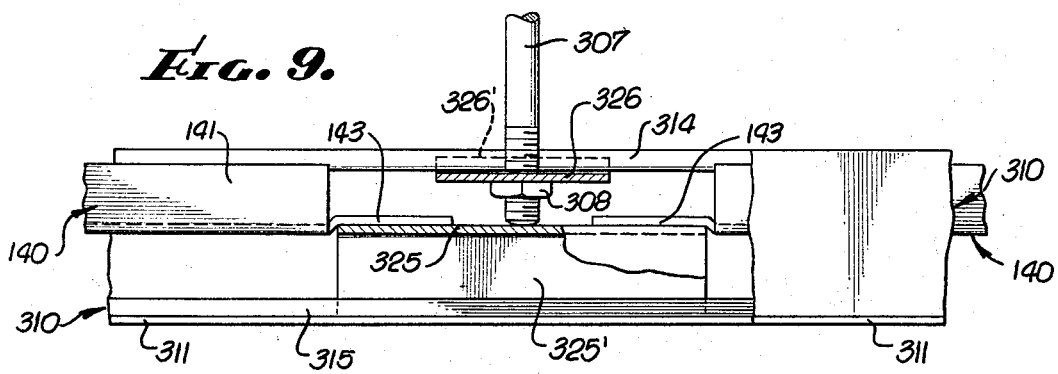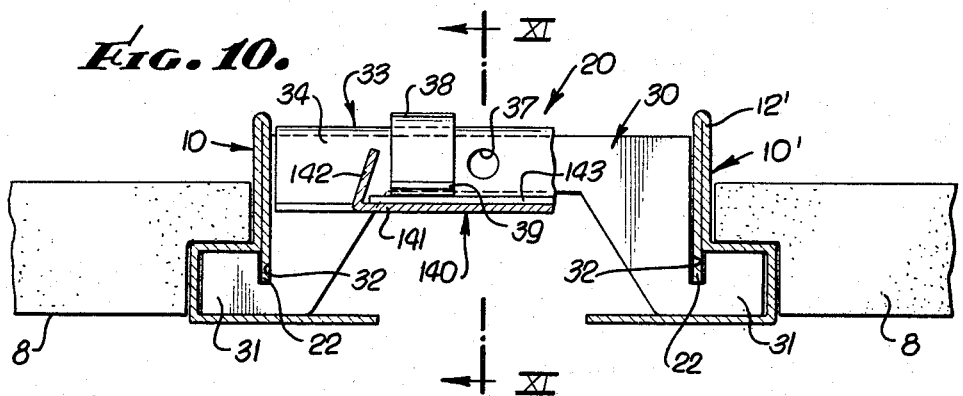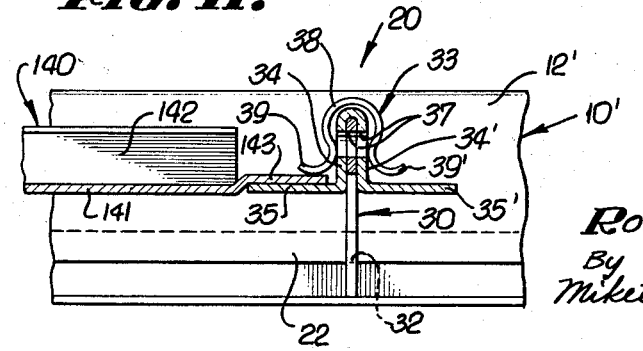

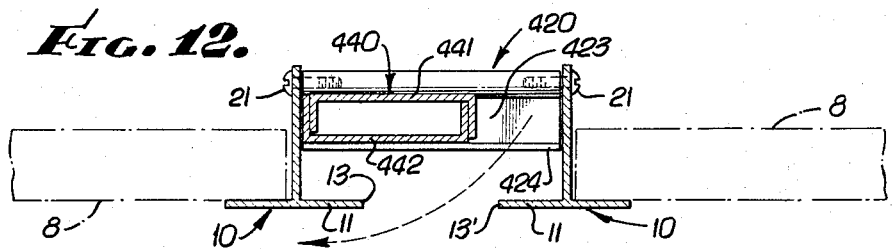
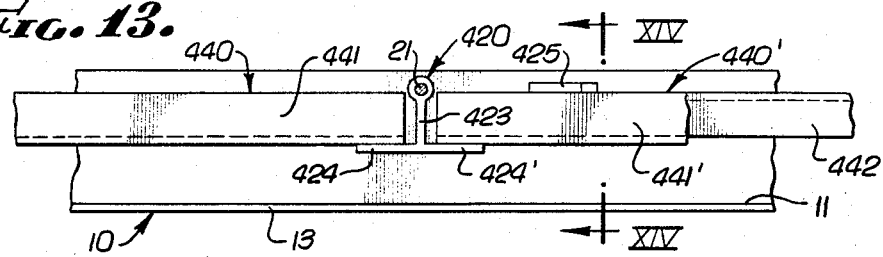
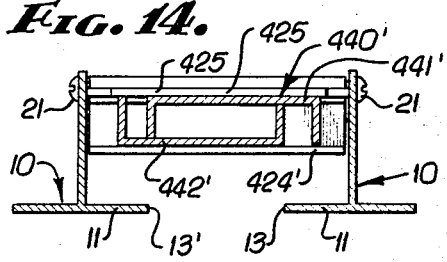
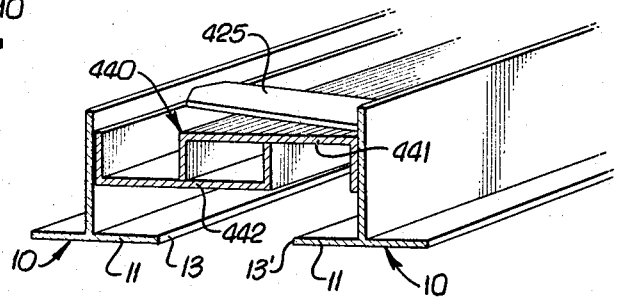
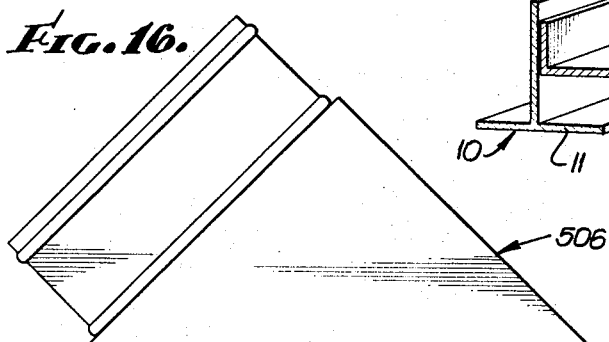
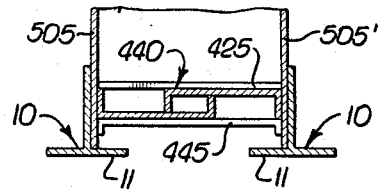
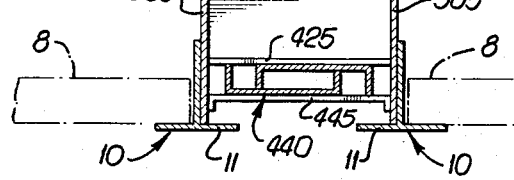
INVENTOR.
ROBERT R. LAMBERT
ATTORNEYS.

3,411,425
AIR DIFFUSION OUTLET WITH LATERALLY ADJUSTABLE WEIR CONTROL
Robert R. Lambert, Glendora, Calif., assignor to Air Factors, Inc., Covina, Calif., a corporation of California
Filed Jan. 9, 1967, Ser. No. 608,094
7 Claims. (Cl. 98—40)

ABSTRACT OF THE DISCLOSURE

A diffuser outlet for use in suspended ceiling installations including a pair of parallel, spaced ceiling elements, each including an upstanding leg and a bottom flange with the bottom flanges extending toward each other to define a diffuser outlet, means interconnecting the pair of ceiling elements in a predetermined spaced relation with the aforementioned flanges spaced from each other and in the ceiling plane to form the diffuser outlet in the plane of the ceiling, a weir member between the legs of said ceiling elements and means for mounting the weir member in a plane virtually parallel to the ceiling plane, but spaced above the flanges, for lateral movement in said plane to vary the direction of flow of air through the outlet.

---

This invention relates to a novel, inexpensive suspended ceiling construction which provides longitudinally extending air diffusion outlets flush with the ceiling, said outlets being readily adjustable from below the ceiling and fully concealed from view. The construction permits the outlets to be placed adjacent to light panels or fixtures, as well as at points distant therefrom, the outlets can be of any desired width, size and direction of flow of air therethrough; the outlets are readily adjusted for cooperation with air supply ducts of different sizes and necks.

The use of suspended ceilings (suspended from the undersurface of the permanent floor or roof of a building, herein referred to as the soffit) has become widespread, and esthetic considerations require that lighting fixtures, air conditioning outlets be flush with the ceiling. The space between the suspended ceiling and the soffit is generally full of air conditioning ducts, plenum chambers, cables, piping, etc. This type of construction gives rise to numerous problems, particularly in large buildings or halls since changes in number and location of personnel occupying such large rooms often requires adjustment of the air distribution means in order to effectively produce suitable air conditioning. Diffusion outlets which extend below the plane of the ceiling (such as those shown in Patents 2,937,589 and 3,031,944) are not acceptable; moreover, they require highly specialized complicated extrusions which greatly increase the cost.

The present invention is directed to a suspended ceiling construction which is of high capacity and still provides diffusion outlets that are inconspicuous, not readily visible, can extend continuously from wall to wall of a large room with no apparent change in appearance and still provide spaced diffusion outlets through which air is being discharged in any desired or different direction. The present construction provides great versatility in that the modulated outlets are capable of being in communication with ducts of different sizes or with ducts supplying air or with ducts or soffit areas used for return air, and readily adapt themselves to necks or connectors of different sizes.

Generally stated, the present invention employs a construction and a novel mode of operation wherein the diffusion elements or means for controlling the direction of flow of air through an outlet does not employ hinged, pivoted devices or complicated baffle arrangements. Relatively simple, readily manufactured ceiling elements are employed, each provided with a flange which lies in the plane of the ceiling. The opposing marginal edges of the flanges generally define an outlet opening. Simple, readily adjustable interconnecting means are provided for holding the ceiling elements in predetermined fixed parallel relationship, but these elements are not visible from below the ceiling. In a plane above the ceiling plane, there is movably positioned a planar weir member which obstructs upward vision through the discharge opening and which is mounted for lateral movement within the space immediately above the flange so as to cause the air to either be discharged through the outlet in a downward direction, to one side along the lower surface of the ceiling or in an opposite direction along the undersurface of the ceiling. The lateral positioning of the weir plate within the diffuser outlet is readily accomplished from below the ceiling.

It is an object of the present invention therefore to disclose and provide a new mode of operation in the control of the flow of air through a longitudinally extending ceiling outlet.

A further object of the invention is to disclose and provide means and constructions whereby longitudinally extending diffusion outlets, flush with the ceiling, can be effectively and economically installed and controlled.

A still further object of the invention is to disclose and provide a versatile construction for readily adjustable, concealed longitudinally extending diffusion outlets in a suspended ceiling, which may utilize a variety of readily available and inexpensive elements.

These and various other advantages and distinctive characteristics of the present invention will become apparent to those skilled in the art from the following description of a number of exemplary forms of the present invention. In such description, reference will be had to the appended drawings wherein:

FIG. 1 is a diagrammatic representation in perspective of a portion of a diffuser outlet construction, showing a oprtion of an air supply duct in association therewith;

FIG. 2 is a transverse section through an interconnecting means and the adjustable weir;

FIG. 3 is a transverse section through a modified form of adjustable outlet;

FIG. 4 is a transverse section of a further modified form of adjustable outlet construction, illustrating a different form of interconnecting means and a somewhat modified form of adjustable weir;

FIG. 5 is a side elevation partly broken away of the arrangement illustrated in FIG. 4;

FIG. 6 is a transverse section of a somewhat more sophisticated form of outlet construction embodying the present invention;

FIG. 7 is a horizontal section taken along the plane VII—VII of FIG. 6;

FIG. 8 is a transverse section of another embodiment of the present invention;

FIG. 9 is a longitudinal section taken along the plane IX—IX of FIG. 8;

FIG. 10 is a transverse section illustrating a different form of ceiling element and interconnecting means;

FIG. 11 is a longitudinal section taken along the plane XI—XI of FIG. 10;

FIG. 12 is a transverse section of a still further modified form of adjustable outlet construction, illustrating a different form of adjustable weir member;

FIG. 13 is a side elevation partly broken away of the arrangement illustrated in FIG. 12;

FIG. 14 is a transverse section of the adjustable outlet construction of FIG. 13 taken therein along the plane XIV—XIV with the adjustable weir member expanded to narrow the air passages therethrough to the diffusion air outlet;

FIG. 15 is a perspective view of the sectioned diffuser outlet construction of FIGS. 12 through 14 with the adjustable weir member halves fully extended outwardly of each other to blank off the associated outlet;

FIG. 16 is a partially sectioned representation of another diffuser outlet construction showing the adjustable weir member mounted between the lower walls of an air plenum means seated between a pair of spaced T-bar ceiling elements; and FIG. 17 is a detail view of the diffuser outlet construction of FIG. 16 showing the adjustable weir member halves adjusted outwardly relative to each other to blank off the associated outlet.

In order to simplify description, elements or members of similar type or function utilized in this construction shall be given the same number; for example, all ceiling elements such as for example the inverted T-bars illustrated in FIGS. 1 to 5, are all identified by the numeral 10. Each of the ceiling elements includes a bottom flange 11 and an upstanding leg portion 12. The pair of ceiling elements is in longitudinally extending parallel and spaced relation whereby the opposing marginal edges 13, 13' of the flanges 11 are spaced from each other and defined therebetween a diffusion air outlet. The flanges 11 lie in the plane of the ceiling whereby the outlet is also in the plane of the ceiling. Outwardly extending portions of the flanges 11 may support acoustical ceiling tile (indicated at dash lines at 8) or lighting fixture housings such as 9. The upstanding legs 12 of each of the ceiling elements may be provided with a plurality of uniformly spaced ports 14 adapted to receive or engage interconnecting means generally indicated at 20, said interconnecting means being arranged to hold the two ceiling elements in predetermined spaced parallel relation.

In the simple embodiment illustrated in FIGS. 1 and 2, the interconnecting means 20 comprises a cylindrical rod of desired length, having a diameter larger than the ports 14; the ends of the rod are internally threaded so as to receive screws 21, thereby holding the pair of ceiling elements in predetermined spaced relation.

An adjustable weir member generally indicated at 40 is movably positioned between the legs of the ceiling elements. The form of weir member illustrated in FIGS. 1 and 2 is provided with a planar bottom 41 and upstanding longitudinal edge portions 42; these edge portions are provided with spaced, aligned ports 44 adapted to slidably receive the cylindrical interconnecting member 20. The plate-like weir member 40 preferably has a width greater than the width of the outlet between the opposing marginal edges 13 of the flanges 11, and may approximate the width of such discharge or outlet opening and the width of one of the inwardly extending flanges 11. It will be understood therefore that the weir member 40 is suspended between the upstanding legs of the ceiling elements on two or more interconnecting means 20 and because of its narrow width, is capable of being moved laterally. In FIG. 2, the weir member is shown with its upstanding edge portions 42 equally spaced from the legs of the ceiling elements; in this position, air admitted downwardly will pass on both sides of the weir plate and be discharged through the diffuser outlet in a generally downward direction. However, when the weir plate 40 is moved laterally (and this can be accomplished from below the plane of the ceiling) so as to assume the position indicated in dotted lines, the air will be discharged in the direction of the dash line arrow along the lower surface of the ceiling.

It will be noted that the central portion of the interconnecting means 20 provides means whereby the assembly may be suspended from a soffit, as for example, by means of a hanger wire indicated at 7. This hanger wire may pass completely through an air supply duct diagrammatically illustrated at 6, said duct having downwardly extending neck portions 5 cooperating with the legs 12 of the pair of ceiling elements. The duct 6 may extend the entire length of the diffusion outlet and by adjusting the position of the weir members 40, certain portions of this common diffusion outlet may discharge air in one direction along a portion of its length and in a different direction along another portion of its length. In addition, certain sections of this common outlet may be blanked out by the use of plate-like members which lie in the same plane as the bottom 41 of the movable weir members, but which extend completely across the space between the upstanding legs 12 of the ceiling elements and thereby prevent any air from being discharged in a zone so blocked. In some installations, only longitudinally spaced portions of duct 6 are provided with neck portions 5, sections between such necks constituting a virtually cylindrical duct. Then, the outlet opening sections below such duct sections may include a weir and allow return air to be drawn into the soffit area.

It will be noticed however that when viewed from the bottom, any such arrangement is inconspicuous. The bottom surfaces of the weir members 40 always lie in the same plane and the space between the upstanding marginal edge portions 42 and the legs of the ceiling members is not visible. As a result, a substantially smooth ceiling impression is obtained, it being understood that the lower surfaces 41 of the weir members are usually painted with the same light color as the outer surfaces of the flanges of the ceiling elements 10.

FIG. 3 is very similar in the construction illustrated to that shown in FIGS. 1 and 2. In FIG. 3, the upstanding longitudinal edge portions 42 of the weir member 40' are shown inwardly curved; moreover, the interconnecting means 20' is a cylindrical bar having reduced ends extending through small ports in the legs of the ceiling elements, the protruding small end portions of the connecting member being staked over in order to hold the two ceiling elements in parallel relation. It will be understood that various other ways of connecting the two ceiling elements in predetermined spaced relation may be employed.

FIGS. 4 and 5 illustrate a further modification wherein the interconnecting means 120 comprises a T-bar 123 having lower horizontally extending flange sections 124. The T-bar has an enlarged or bulbous end along the edge of its leg, the ends being internally threaded so as to receive screws 21 and thereby firmly hold the two parallel ceiling elements 10 in properly spaced relation. The virtually horizontal sections 124 of the interconnecting member 120 are adapted to support the weir member 140. In order to present a lower surface which is substantially planar, the upstanding longitudinal edge portions 142 of the weir member are inwardly inclined and are shorter than the overall length of the weir member. The bottom portion 141 of the weir member is therefore longer than the upstanding sides 142 and the extensions of the bottom planar portion indicated at 143 lie in a plane slightly offset from the plane of the bottom 41, these end tabs 143 (best shown in FIG. 5) overlying the substantially horizontal sections 124 of the interconnecting means 120. The entire weir member 140 can slide from right to left and assume any desired position by the cooperation of the tabs 143 with the horizontal surfaces 124. To prevent the weir 140 from rattling, bar 123 may be provided with ribs 129 above flanges 124. A flat spring 128 inserted between such ribs and the tab 143 of a weir 140 will prevent rattling without preventing adjustment of the weir.

FIGS. 6 and 7 show a somewhat more sophisticated form of interconnecting means and the cross-sectional configuration of the ceiling elements includes means for further cooperation with the interconnecting means. As there illustrated, the ceiling elements 210 are provided with an upper, downwardly opening groove 214 and a lower upwardly opening groove 215, the two grooves being spaced from each other and both extending along the longitudinal faces of the legs of the opposing ceiling elements. The interconnecting means comprises an upper connecting member 226 and a lower connecting member 225; it will be noted that the lower connecting member 225 is provided with a downwardly extending marginal lip 225' adapted to enter and engage the upwardly open groove 215. The upper interconnecting member 226 has marginal lips 226' which face upwardly and enter and engage the downwardly open groove 214 of the ceiling elements. The upper and lower members 226 and 225 are made of sheet metal and centrally of the upper member 226 there is provided a pierced boss 227 adapted to receive the threaded end of a suspension member or rod 207. The threads may be of the self-seating type and when the rod 207 is threaded downwardly through the pierced boss 227, the rounded lower end of the rod 207 will bear against the central portion of the lower interconnecting member 225 thereby forcing the lips of both members into their respective grooves and locking the entire assembly together with the legs of the ceiling elements in properly spaced parallel relation.

Although these members 225 and 226 extend transversely of the ceiling elements, they are preferably cruciform in plan and carry arms such as the arms 228, 228', more clearly shown in FIG. 7, these additional longitudinally extending arms performing a dual function. As shown in FIGS. 6 and 7, the weir member 240 may carry a bail strap 245 adjacent each end, said strap being either integral with or suitably attached to the inwardly inclined longitudinal marginal edge portions of the weir. The bail strap 245 extends over the longitudinally directed horizontal section 228 of the connecting member 225 and since the extension 228 is narrower than the weir member, the weir member may again be laterally adjusted into any desired position between the upstanding legs of the parallel ceiling elements.

In addition, it has been found desirable, in order to give the device greater flexibility and adaptability, to make the connecting members longer in one dimension than in a dimension at right angles thereto. In other words, the distance separating the downturned lips at the margins of extensions 228 and 228' is preferably greater by a predetermined increment than the distance separating the downwardly extending lips 225' shown in engagement with the upstanding grooves in FIG. 6. It is to be remembered that the width of the diffusion outlet may be required to be larger in one installation than in another and, in some installations, the neck size of the air supply ducts is larger than in other installations. Therefore, when it is desired to place the ceiling elements 210 at a greater spacing, the connecting members can be used with the arms 228 and 228' extending transversely of the discharge outlet and into the grooves 215.

It will be noted that in FIG. 6 the left hand ceiling element is provided with a pair of opposing grooves 216 and 216' on the external surface of the leg, these grooves running longitudinally of the element. When it is desired to extend the construction and place another section of a ceiling element in alignment with another, a flat strip of metal can be inserted as an interlocking key into such opposing grooves, the key engaging the grooves in the abutting end portions of aligned elements and thereby holding them in position with respect to each other. A similar arrangement can be utilized on any of the other forms of ceiling elements depicted herein.

Moreover, as illustrated in FIG. 6, the right hand ceiling element is shown formed with a short outstanding rib 217. This rib is occasionally employed when the ceiling tile used are of the tongue and groove variety.

FIGS. 8 and 9 show an arrangement rather similar to that illustrated in FIGS. 6 and 7, but it will be noted that the lower upwardly open groove 315 of ceiling elements 310 is positioned adjacent the lower flange 311 of each ceiling element so that the lower connecting member 325 is provided with longer downwardly extending lips 325'. Moreover, the lower connecting member 325 is shown as of generally rectangular shape (not cruciform) and wider than the upper connecting member 326 as seen in FIG. 9. The threaded end of rod-like member 307 may be provided with a nut 308 so that rotation of the rod 307 coupled with a turning of the nut thereon will exert suitable oppositely directed forces upon the upper and lower connecting members 325 and 326 so as to firmly seat their flanges 325' and 326' in their respective grooves 315 and 314. FIGS. 8 and 9 further distinguish from FIGS. 6 and 7 in that the weir member 140 is not provided with a bail strap but, instead, is formed in the manner illustrated in FIGS. 4 and 5 and described hereinbefore. It will be noted that the offset portion 143 of the weir 140 rests upon the substantially horizontal body section of the connecting member 325 and can be moved laterally while supported by such member.

FIGS. 10 and 11 are particularly directed to a further modification wherein the interconnecting means includes a sheet metal member 30 of inverted U-shape, the arms of such member extending laterally as indicated at 31 to form enlargements separated by a groove 32 adapted to receive a downwardly depending portion 22 of the upstanding leg member 12' of a fabricated ceiling element, indicated generally at 10'. This type of interconnecting member 30 can be first placed in a substantially horizontal position and then raised into vertical position with the enlarged extensions 31 fitting into the pockets formed in the legs of the two ceiling elements, thereby locking the two ceiling elements in position with respect to each other. The interconnecting means 20 also includes a saddle member indicated generally at 33 having closely adjacent sides 34 and 34' and substantially horizontal extensions 35 and 35' at the ends of said sides. This generally U-shaped saddle member is placed in inverted position over the body portion of the interconnecting means 20. Since the transverse dimension of the saddle is substantially equal to the desired spacing between the legs of the ceiling elements, the saddle assists in holding the elements in position. Moreover, the substantially horizontal extensions 35 and 35' provide a support capable of cooperating with the end tabs 143 of the weir member 140 whereby, again, the weir member may be laterally adjusted into any desired position for the purpose of changing the direction of flow of air through the diffusion outlet. It may be noted that a through port 37 is formed both through the body portion of member 30 and through the saddle so as to permit a suitable hook, wire or other suspending means to be attached to the interconnecting means and to a soffit or other support.

A spring clip 38 may be pressed over the upper edge of the saddle, as seen in FIG. 11, with outwardly, oppositely extending resilient spring arms 39 and 39' overlying and holding the adjacent weir end tabs, as tab 143, down against the associated saddle extensions 35 and 35', respectively, to prevent rattling thereof without preventing selective adjustment of the adjacent weir members.

Referring now to FIGS. 12 through 15, a still further modification of the exemplary diffuser outlet constructions according to the present invention is shown with the inverted T-bar ceiling elements, indicated generally at 10, of the prior exemplary embodiments having opposed flanges 11, 11 defining a diffusion air outlet by opposed marginal edges 13, 13'. The interconnecting means, indicated generally at 420, for interconnecting and spacing the ceiling elements 10, 10 comprises an inverted T-bar 423 having the lower horizontally extending flange sections 424 and 424'. The T-bar 423 has an enlarged or bulbous end along the upper edge of its central leg portion and is held between and spaces the ceiling elements 10, 10 by the provision of screws 21, 21 as in the embodiment of FIGS. 4 and 5. These virtually horizontal flange sections 424 and 424' are adapted to support adjacent weir members, indicated generally at 440 and 440' and as best seen in FIG. 13. These modified form of weir members, indicated generally at 440 and 440', are held down against the flanges 424 and 424' by removable flat wedge elements 425, as best seen in FIGS. 13 and 15, which can be easily removably wedged into place over the adjustable weir members after they are adjusted as hereinafter explained.

As in the foregoing exemplary embodiments, the modified form of adjustable weir members, indicated generally at 440 and 440', are adjustable laterally between the ceiling elements 10, 10 upon the interconnecting means to control the direction of air flow through the diffusion air outlet defined by the opposed marginal edges 13, 13' of the ceiling element lower flanges 11, 11. With the adjustable weir member, indicated generally at 440, moved laterally against the left hand ceiling element 10 of FIG. 12, the direction of air flow will be from right to left beneath the ceiling surface as indicated by the dash line in FIG. 12. The weir member can be moved as a unit to the extreme right hand side of the construction against the right hand ceiling element to cause air flow in the opposite direction, as is illustrated by the dotted line showing of the embodiment of FIG. 2. The flat spring-like wedge elements 425 may be inserted in place to hold the weir members after their lateral adjustment to the selected location for desired air flow direction control.

The exemplary modified form of weir members, indicated generally at 440 and 440' of the present invention are further adjustable to narrow the air flow passages through the construction and even to completely blank out the diffusion air outlet as shown respectively in FIGS. 14 and 15. In this alternative exemplary embodiment, each of the weir members is provided with two relatively adjustable halves including the upper halves 441, 441' and lower halves 442 and 442', respectively. As seen in FIG. 14, the upper and lower halves are of generally channel configuration with generally right angle flanges extending from a generally planar web portion as in the construction of the weir member, indicated generally at 40, in the embodiment of FIGS. 1 and 2. The two weir member halves are nested together with one of their respective flanges positioned in the channel formed by the spaced flange and interconnecting web of the other half. The two weir member halves thus provide laterally adjustable vertically spaced planar surfaces which may be laterally adjusted relative to each other to constrict or narrow the air flow passages between the outer flanges and the adjacent ceiling elements 10, 10. The lateral adjustment preferably allows a complete closing of the air flow passages between the associated ceiling elements to blank off the associated diffusion air outlet as shown in FIG. 15. When in the fully open position of FIG. 12, the weir member, indicated generally at 440, including the two nested halves is preferably of a width approximately equal to the width of the diffusion air outlet, defined between the marginal edges 13, 13' and the width of a flange 11, as seen in FIG. 12.

In each of the foregoing exemplary embodiments, the exemplary weir members were mounted for lateral movement between the spaced ceiling elements 10, 10 on interconnecting means directly connected to the upstanding leg portions of the ceiling elements. It is contemplated that the weir member may be mounted within the outlet of a plenum means which in turn is seated between spaced ceiling elements as shown in the further alternative exemplary embodiment of FIGS. 16 and 17. As seen in FIG. 16, an air plenum means, indicated generally at 506 is provided with lower spaced walls 505 defining an air outlet from the plenum means and supporting it on the spaced ceiling inverted T-bar elements, indicated generally at 10, 10. The lower edges of the legs 505, 505' seat upon and are supported by the flanges 11, 11 of the ceiling elements. As in the prior exemplary embodiments, the flanges 11 define the diffusion air outlet from the diffuser construction and a laterally adjustable planar weir member, indicated generally at 440 is mounted for lateral movement in a plane spaced vertically above and generally parallel to the diffusion air outlet defined by the flanges 11, 11. The weir members and interconnecting means of the foregoing exemplary embodiments for mounting the weir member between and spacing the ceiling elements 10 may be employed between the plenum means side walls 505, 505'. In the exemplary embodiment, the weir member, indicated generally at 440, of the exemplary embodiment of FIGS. 12 through 15 is illustrated laterally movably mounted within the plenum means outlet spaced vertically above the diffusion air outlet on inverted spaced channel support members 445 and held in adjusted position by flat wedge elements 425. The weir member may be adjusted laterally within the plenum means outlet to control the direction of air flow, the volume of air discharged and can be positioned in the fully expanded position of FIG. 17 blanking out the associated air plenum means from the longitudinally extending diffusion air outlet between flanges 11, 11.

Although a number of modifications have been described, it is evident that in each instance a diffusion outlet of any desired length has been provided such outlet lying in the plane of a suspended ceiling. The construction herein disclosed provides means for interconnecting a variety of ceiling elements so as to firmly hold such elements in desired parallel relation. The transversely extending interconnecting means is adapted to receive and cooperate with suspension means. Every embodiment of the present invention includes a planar plate-like weir member which may be of any desired length, movable in a horizontal plane slightly above the plane of the diffusion outlet, the weir member being capable of lateral adjustment as to its position so as to change the direction in which air is being discharged through the diffusion outlet. The inwardly extending flanges of the ceiling elements cooperate with the weir member not only in suitably directing the flow of air, but also in preventing observers below the ceiling from staring into the inner workings of the heating and ventilating system. It may be noted that arrangements such as are indicated in FIGS. 6 to 11 do not require careful spaced drilling of holes in ceiling elements (a rather difficult accomplishment when long lengths are involved) and permit the placement of the transverse interconnecting means at any desired point along the length of the ceiling elements. Moreover, means and constructions have been disclosed which produce a uniform planar surface, not only in the plane of the ceiling, but also in a plane just within the ceiling and beyond the diffusion outlet.

It is to be understood that the construction here disclosed is not limited to the use of but a single pair of parallel ceiling elements; three, four or five ceiling elements can be used in spaced parallel relation and appropriate weir members or blank fillers used between such elements. For example when four parallel, spaced ceiling elements are used, the space between the center pair can be provided with abutting lengths of blanking members (similar to member 25, shown in FIG. 5) whereas the spaces between outer pairs of ceiling elements may be provided with the laterally positionable weir elements, either along the entire length of the ceiling elements or wherever an air outlet is desired. Such multiple ceiling diffuser strips in adjacent relation can be used to discharge air in different directions and/or provide return air parts at any desired portion of a run. Wherever an air outlet is not needed, a filler blank, as wide as the space between legs of adjacent ceiling members, can be installed.

Filler blanks may rest on the flanges of the ceiling elements or be supported by the interconnecting means to lie in the plane of the weir elements: these fillers permit adjustable outlets to be positioned at any desired location and present a uniform appearance.

Those skilled in the art will recognize that various aspects herein disclosed may be combined in manners other than those shown in the illustrations. Moreover, the width of the flanges, the height of the legs, the number of auxiliary flanges or grooves, whether the flanges carried by a single ceiling element are of the same width on either side of a leg or not, and other modifications and changes in size, thickness or proportions are well within the skill of those in this art and the invention is not to be limited to the precise illustrations and examples given. All changes and modifications coming within the scope of the appended claims are embraced thereby.

I claim:

1. In a versatile construction adapted to provide readily adjustable, concealed, longitudinally extending diffuser outlets in a suspended ceiling, the provision of:
   a pair of parallel, spaced ceiling elements, each including an upstanding leg and a bottom flange;
   means interconnecting said pair of elements in predetermined spaced relation with flanges spaced from each other and in a ceiling plane to form a longitudinal outlet;
   and a weir member including a pair of spaced upstanding side flanges interconnected by a web portion having a width greater than that of said outlet and means for mounting said weir member for lateral movement between said legs to vary the spacing of said weir member side flanges from said ceiling element legs and to thereby vary the direction of air flow through said outlet;
   wherein said weir member comprises two relatively adjustable channel-shaped body portions nested together with a side flange of each positioned between the side flanges of the other.

2. A construction as stated in claim 1 wherein said means for mounting said weir member in a plane virtually parallel to the ceiling plane and between the legs of said ceiling elements includes the lower spaced walls of a plenum means seated in between said ceiling elements.

3. A diffusion controlling weir for use between a pair of spaced parallel ceiling members at least one of said members being provided with a bottom flange, being spaced from the other of said members and defining a longitudinal air outlet in a ceiling plane therewith, said weir comprising:
   an elongated weir member provided with a pair of planar relatively movable imperforate body halves, each of said halves being a generally U-shaped channel having a web with a width greater than that of said outlet, and means for mounting said body halves in opposed and nested relation between said ceiling members in a first plane spaced above and generally parallel to a second plane defined by said outlet, said halves being movable together laterally in said first plane to vary the direction of air flow from said outlet and movable relative to each other to vary the amount of air flow from said outlet.

4. In a versatile construction adapted to provide readily adjustable, concealed, longitudinally extending diffuser outlets in a suspended ceiling, the provision of:
   a pair of parallel, spaced ceiling elements, each including an upstanding leg and a bottom flange, the flanges extending toward each other;
   means interconnecting said pair of elements in predetermined spaced relation with flanges spaced from each other and in ceiling plane;
   a weir member between the legs of said ceiling elements, having a planar body portion in a plane vertically parallel to the ceiling plane but spaced above said flanges, said weir member being narrower than the distance separating the legs of the ceiling elements and mounted for lateral movement therebetween to vary the direction of flow of air from between said ceiling elements;
   and said weir member comprises two generally U-shaped channel members each having a generally planar web portion having a width approximately equal to the width of a ceiling element flange plus the width of the outlet formed between the spaced ceiling element bottom flanges, said channel members being nested together with a channel side flange of each member positioned between side flanges of the other member.

5. A diffuser controlling weir for use between a pair of spaced parallel ceiling elements, at least one of said ceiling elements being provided with a bottom flange being spaced from and extending toward the other of said elements and defining a longitudinal air outlet in a ceiling plane therewith, said weir comprising:
   a pair of elongated planar relatively movable weir members, each of said members being a generally U-shaped channel, and means for mounting said weir members in opposed and nested relation between said ceiling elements in a first plane spaced above and generally parallel to a second plane defined by said outlet, said weir members being movable together laterally in said first plane to vary the direction of air flow from said outlet and laterally movable relative to each other in nested relation to a width greater than that of said outlet and to vary the amount of air flow from said outlet.

6. The diffuser controlling weir of claim 5 wherein the weir members are laterally movable to a width at least equal to the distance between said pair of spaced parallel ceiling elements.

7. A diffuser controlling weir for use between a pair of spaced parallel ceiling elements, at least one of said ceiling members being provided with a bottom flange being spaced from and extending toward the other of said members and defining a longitudinal air outlet in a ceiling plane therewith, said weir comprising:
   an elongated weir member provided with a pair of planar relatively movable imperforate body halves, each of said halves being a generally U-shaped channel having a web with a width greater than that of said outlet, and means for mounting said body halves in opposed and nested relation between said ceiling members in a first plane spaced above and generally parallel to a second plane defined by said outlet, said halves being movable together laterally in said first plane to vary the direction of air flow from said outlet and movable relative to each other in nested relation to vary the amount of air flow from said outlet.

References Cited

UNITED STATES PATENTS

| | | | |
|---|---|---|---|
| 3,295,432 | 1/1967 | Palmquist | 98—40 |
| 3,276,348 | 10/1966 | Kennedy | 98—40 |

OTHER REFERENCES

Duo-Flex Corporation, brochure, Jan. 24, 1966.

ROBERT A. O'LEARY, *Primary Examiner.*

W. E. WAYNER, *Assistant Examiner.*